US009316129B2

(12) United States Patent
Hattori

(10) Patent No.: US 9,316,129 B2
(45) Date of Patent: Apr. 19, 2016

(54) INTAKE CONTROL VALVE AND ASSEMBLY METHOD THEREOF

(71) Applicant: DENSO CORPORATION, Kariya, Aichi-pref. (JP)

(72) Inventor: Hiroaki Hattori, Gifu (JP)

(73) Assignee: DENSO CORPORATION, Kariya (JP)

( * ) Notice: Subject to any disclaimer, the term of this patent is extended or adjusted under 35 U.S.C. 154(b) by 45 days.

(21) Appl. No.: 14/532,354

(22) Filed: Nov. 4, 2014

(65) Prior Publication Data

US 2015/0122206 A1 May 7, 2015

(30) Foreign Application Priority Data

Nov. 7, 2013 (JP) ................. 2013-230995

(51) Int. Cl.
*F01L 1/00* (2006.01)
*F01L 7/18* (2006.01)
*F02M 35/10* (2006.01)

(52) U.S. Cl.
CPC ............ *F01L 7/18* (2013.01); *F02M 35/10255* (2013.01); *Y02T 10/146* (2013.01); *Y10T 29/49298* (2015.01)

(58) Field of Classification Search
CPC ............... F01L 7/18; Y10T 29/49298; F02M 35/10255

USPC ...................... 123/90.1; 137/601.18
See application file for complete search history.

(56) References Cited

U.S. PATENT DOCUMENTS 8,196,605 B2 * 6/2012 Akiyama ............. F02D 9/1055
123/339.24
2004/0055565 A1 3/2004 Yamamoto et al.

FOREIGN PATENT DOCUMENTS

JP 2002-317718 10/2002

* cited by examiner

*Primary Examiner* — Ching Chang
(74) *Attorney, Agent, or Firm* — Nixon & Vanderhye PC

(57) ABSTRACT

An intake control valve has a body, a valve, and a shaft. The valve has a connecting portion, a first boss located at an end of the connecting portion in the rotation axial direction; and a second boss located at an other end of the connecting portion in the rotation axial direction. The body has first and second bearing portions supporting the first and second protruding portions, respectively, first and second projection portions projecting inward from inner surfaces of the first and second bearings, respectively, to slidably support the first and second bosses, respectively, and first and second insertion openings defined between one circumferential end and an other circumferential end of the first and second projection portions, respectively. The first and second projection portions partially cover the first and second bosses, respectively, in a circumferential direction of the first boss and the second boss.

13 Claims, 7 Drawing Sheets

INTAKE CONTROL VALVE AND ASSEMBLY METHOD THEREOF

CROSS REFERENCE TO RELATED APPLICATION

This application is based on Japanese Patent Application No. 2013-230995 filed on Nov. 7, 2013, the disclosure of which is incorporated herein by reference in its entirety.

TECHNICAL FIELD

The present disclosure relates to an intake control valve and an assembly method thereof. Especially, the intake control valve is used in an intake system (i.e., a variable intake system) for an internal combustion engine.

BACKGROUND

Conventionally, an internal combustion engine (i.e., an engine) having cylinders includes a surge tank, and the surge tank is divided into two chambers, a first surge tank and a second surge tank, by disposing a partition wall. The partition wall includes an opening through which the first surge tank and the second surge tank are communicated with each other. An intake control valve is disposed at the opening. The intake control valve has a valve part (e.g., a butterfly valve). When the butterfly valve is fully closed, the first surge tank and the second surge tank are separated from each other. When the butterfly valve is fully open, the first surge tank and the second surge tank are communicated with each other. Such variable intake system is described in, for example, patent document 1 (JP No. 4053393 corresponding to US 2004/0055565 A1).

The intake control valve has a valve holder. The valve holder will be referred to as a valve body hereafter. The valve body includes a valve hole passing through the valve holder. The butterfly valve includes a shaft holder to which a shaft is inserted. The shaft holder is rotatably disposed in a bearing of the valve body such that the valve hole is opened or closed by moving the shaft. The valve body having the butterfly valve is inserted in the opening of the surge tank.

According to the intake control valve described in patent document 1, the shaft is inserted in the shaft holder. A recessed portion of the butterfly valve and a valve holding portion of the shaft are fitted to each other, and the butterfly valve is fastened to the shaft by a bolt. Therefore, the number of components and man-hour are large, and cost increases.

Then, a shaft may be press-fitted to a butterfly valve made of synthetic resin, as described in patent document 2 (JP No. 4901016), to reduce the number of components and man-hour so as to reduce cost.

According to an intake control valve described in patent document 2, the butterfly valve is integrally formed with a shaft holder and bearings. The shaft holder is located at a center portion of the butterfly valve, and the shaft is fixed to the shaft holder. One of the bearings is located at an end side of the butterfly valve in a rotation axial direction of the butterfly valve, and the other bearing is located at another end side of the butterfly valve facing the one end side in the rotation axial direction. The bearings rotate and slide relative to bearing holders provided in the valve body of an intake manifold.

According to the above structure, since the valve body has the bearings, bearings holding the butterfly valve are not provided. In this case, a location of the butterfly valve is not set with respect to the valve hole of the valve body. Accordingly, the shaft cannot be press fitted in the shaft holder of the butterfly valve. In the result, specific bearing holders described in patent document 2 are required.

SUMMARY

It is an objective of the present disclosure to provide an intake control valve and an assembly method thereof with which a central axis of first and second bosses that are included in a valve and a central axis of first and second bearing portions that are included in a body can easily coincide with each other.

It is another objective of the present disclosure to provide the intake control valve and the assembly method thereof with which a shaft can be inserted easily to a connecting portion of the valve, the first and second bosses, and the first and second bearing portions such that a producing cost can be reduced by reducing the number of components and assembly works.

An intake control valve of the present disclosure has a body, a valve, and a shaft. The body has a valve seat that is formed in an annular shape and has a space passing through the valve seat to communicate with a cylinder of an internal combustion engine. The valve fits the valve seat to close the space or separating from the valve seat to open the space. The shaft is connected to the valve to rotate integrally with the valve, and extends in a rotation axial direction of the valve. The valve has a connecting portion, a first boss, and a second boss. The connecting portion extends in the rotation axial direction. The first boss has a cylindrical shape and is located at an end of the connecting portion in the rotation axial direction. The second boss has a cylindrical shape and is located at an other end of the connecting portion in the rotation axial direction. The shaft has a fitting portion, a first protruding portion, and a second protruding portion. The fitting portion fits the connecting portion and is coupled with the connecting portion, the fitting portion passing through the first boss and the second boss in the rotation axial direction. The first protruding portion protrudes from an end surface of the first boss in the rotation axial direction outward from the valve in the rotation axial direction. The second protruding portion protrudes from an end surface of the second boss in the rotation axial direction outward from the valve in the rotation axial direction. The body has a first bearing portion, a second bearing portion, a first projection portion, a second projection portion, a first insertion opening, and a second insertion opening. The first bearing portion supports the first protruding portion rotatably. The second bearing portion supports the second protruding portion rotatably. The first projection portion is formed in a semi-annular shape and projects inward from an inner surface of the first bearing. The first projection portion supports the first boss slidably. The second projection portion is formed in a semi-annular shape and projects inward from an inner surface of the second bearing. The second projection portion supports the second boss slidably. The first insertion opening is defined between one circumferential end and an other circumferential end of the first projection portion. The first insertion opening is open to a radial direction of the first projection portion. The second insertion opening is defined between one circumferential end and an other circumferential end of the second projection portion. The second insertion opening is open to the radial direction to which the first insertion opening is open. The first projection portion and the second projection portion partially cover the first boss and the second boss, respectively, in a circumferential direction of the first boss and the second boss.

A method for assembling the intake control valve includes (i) placing the first boss and the second boss on the first projection portion and the second projection portion, respectively, through the first insertion opening and the second insertion opening, respectively, (ii) inserting the shaft to the first bearing portion, the first boss, the connecting portion, the second boss, and the second bearing portion, in this order, and (iii) coupling the valve and the shaft to rotate integrally with each other.

According to the intake control valve and the method for assembling the intake control valve, the central axis of the first and second bosses and the central axis of the first and second bearing portions can easily coincide with each other. Furthermore, the first and second projection portions can hold the valve while the central axis of the first and second bosses and the central axis of the first and second bearing portions coincide with each other. Therefore, the shaft can easily be inserted to the connecting portion, the first and second bosses, and the first and second bearing portions. In the result, the number of components and the assembling works can be reduced, and the manufacturing cost can be reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
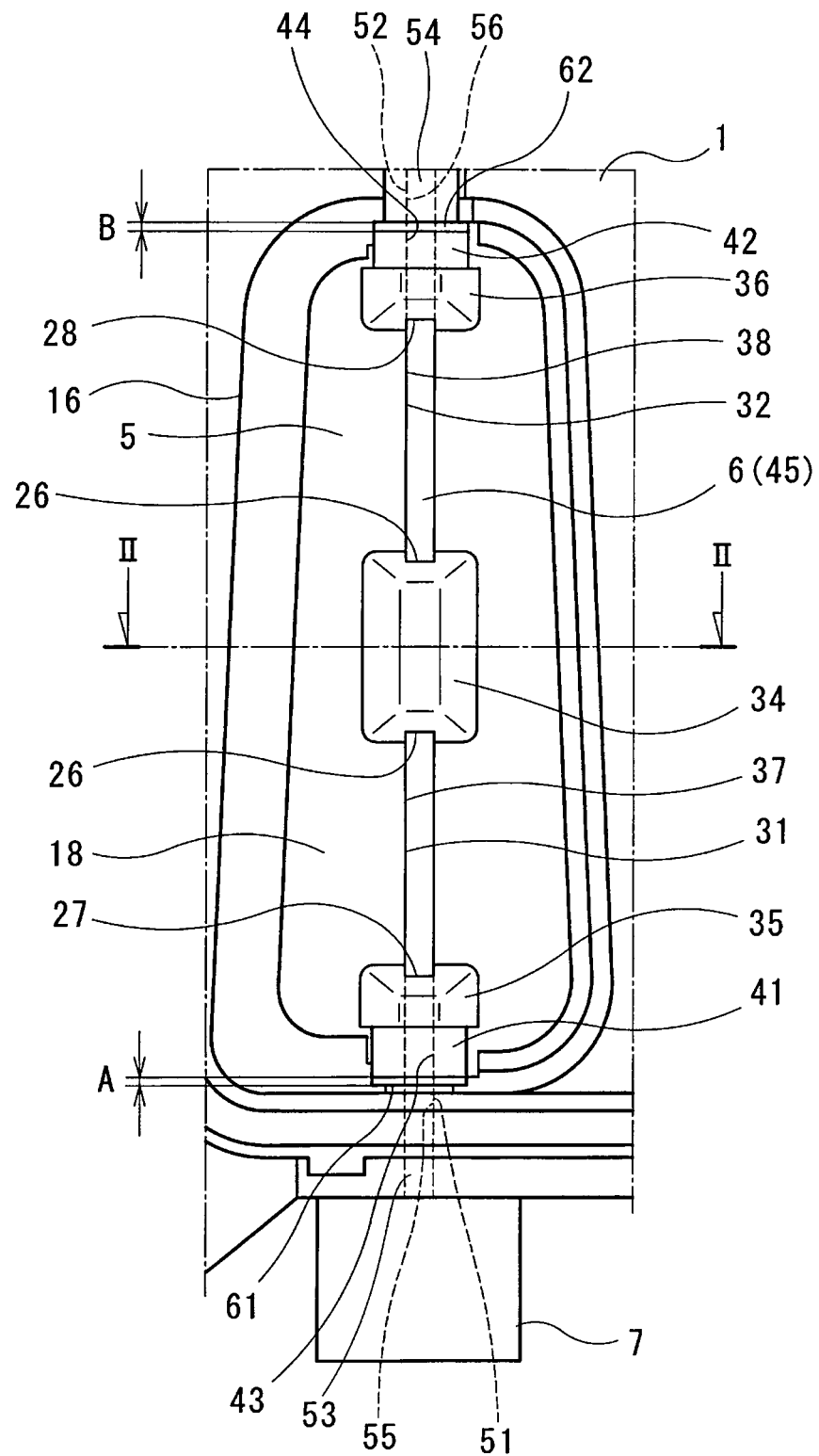
FIG. 1 is a schematic view illustrating an intake control valve assembled in a surge tank of an intake manifold according to a first embodiment.

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment will be described referring to FIGS. 1 to 5.

A control device for an internal combustion engine (i.e., an engine control system) of the present embodiment has a variable intake system for the internal combustion engine (i.e., an engine: E/G). In the variable intake system, a length of an intake passage is changed depending on an operation condition of the engine.

The variable intake system has a surge tank providing a passage communicated with a combustion chamber of a cylinder of the engine and an intake control valve disposed in the surge tank.

The surge tank is integrally provided with an intake manifold and is located at an upstream side of the intake manifold having intake branch pipes. Specifically, first intake branch-pipes and second intake branch-pipes are connected to the surge tank. The surge tank has a partition wall separating an inside of the surge tank into two chambers, a first surge-tank chamber and a second surge-tank chamber.

The intake control valve has a valve body 1 made of synthetic resin and disposed integrally with the partition wall in the surge tank. The valve body 1 has a pair of valve seats, a valve seat 2 and a valve seat 3, that are integrally formed with each other at a specified portion of the valve body 1. As show in FIG. 2, each of the valve seat 2 and the valve seat 3 includes a space 4 passing through the valve seat 2 and the valve seat 3 to communicate with a combustion chamber of a cylinder of the engine.

The intake control valve further has a valve part, a shaft 6, an actuator 7, and a return spring (not shown). The valve part is a butterfly valve 5 according to the present embodiment. The butterfly valve 5 is moved to separate from the valve seats 2, 3 so as to open the space 4 or moved to fit the valve seats 2, 3 so as to close the space 4. The shaft is supported to rotate integrally with the butterfly valve 5. The actuator operates the shaft 6 to open or close the butterfly valve 5. The return spring biases the butterfly valve 5 in an opening direction or a closing direction. An electric control unit (i.e., an ECU) (not shown) controls energization of a motor that is a power source for the actuator 7 such that an opening degree of the butterfly valve 5 is set to a target opening degree depending on an engine operation condition. For example, the opening degree is set to a fully closing degree, fully open degree, or intermediately open degree.

Intake air (i.e., intake) in the first surge-tank chamber is supplied to the combustion chamber of the cylinder through the first intake branch-pipe. The cylinder is one of cylinders of the engine, the combustion chamber is one of combustion chambers, and the first intake branch-pipe is one of the first intake branch-pipes. The number of the combustion chamber and the number of the first intake branch-pipes, respectively, is the same as the number of the cylinders. An inside of the first intake branch-pipe defines a first branch passage 11 communicated with the first surge-tank chamber.

Intake air (i.e., intake) in the second surge-tank chamber is supplied to the combustion chamber of the cylinder through the second intake branch-pipe. The second intake branch-pipe is one of second intake branch-pipes, and the number of the second intake branch-pipes is the same as the number of the cylinders. An inside of the second intake branch-pipe defines a second branch passage 12 communicated with the second surge-tank chamber.

A length of the first branch passage 11 is longer than a length of the second branch passage 12.

Instead of forming the first branch passage 11 and the second branch passage 12 to be different from each other in length, the first branch passage 11 and the second branch passage 12 may be formed to be different from each other in cross-sectional area. In such a case, a cross-sectional area of the first branch passage 11 is smaller than a cross-sectional area of the second branch passage 12.

The variable intake system improves an output torque of engine. Specifically, a length of a passage from the space 4 of the partition wall that is disposed in the surge tank to an intake port of the cylinder is changed depending on the operation condition (i.e., an operation state) of the engine. Accordingly, pulsation effect and inertia supercharging effect of intake air occurring in the intake passage of the engine can be used effectively.

The inertia supercharging effect is a supercharging effect with which a greater amount of intake air is drawn into the combustion chamber by using inertial force occurring due to pulsation of the intake air that is drawn into the combustion chamber.

As described above, the intake control valve has the valve body 1 including the valve seats 2, 3, the butterfly valve 5, the shaft 6, and the actuator 7. The butterfly valve 5 is one of butterfly valves.

The butterfly valve 5 is a plate valve having a rectangular shape and opening or closing the space 4. Furthermore, the butterfly valve 5 is a rotation-type valve. The butterfly valve 5 is made of synthetic resin and is seamlessly formed in a specified shape. The butterfly valve 5 is coupled with the shaft 6.

The butterfly valve 5 rotates relative to the partition wall of the surge tank (i.e., the valve body 1) such that the opening degree of the butterfly valve 5 is varied within a range between the fully closing degree and the fully open degree. At the fully closing degree, the butterfly valve 5 is at a fully closing position where the butterfly valve 5 fully closes the second branch passage 12. At the fully open degree, the butterfly valve 5 is at a fully open position where the butterfly valve 5 fully opens the second branch passage 12.

Figure 2:
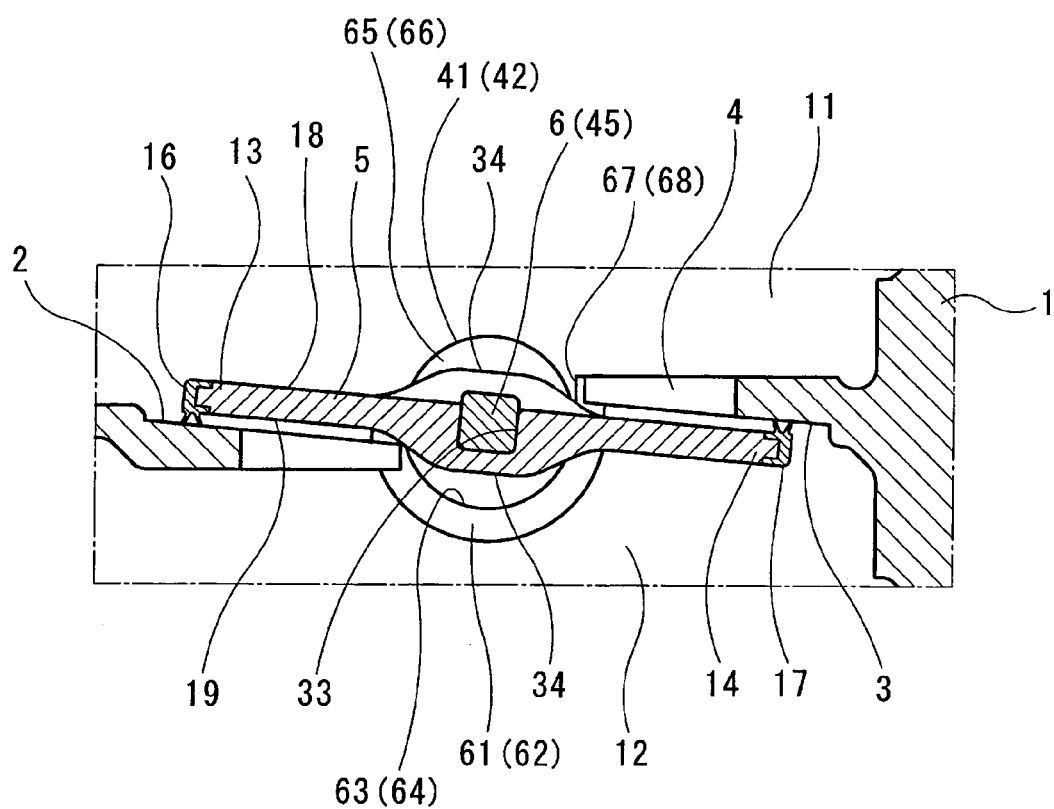
FIG. 2 is a cross-sectional view taken along a line II-II shown in FIG. 1.
Figure 3:
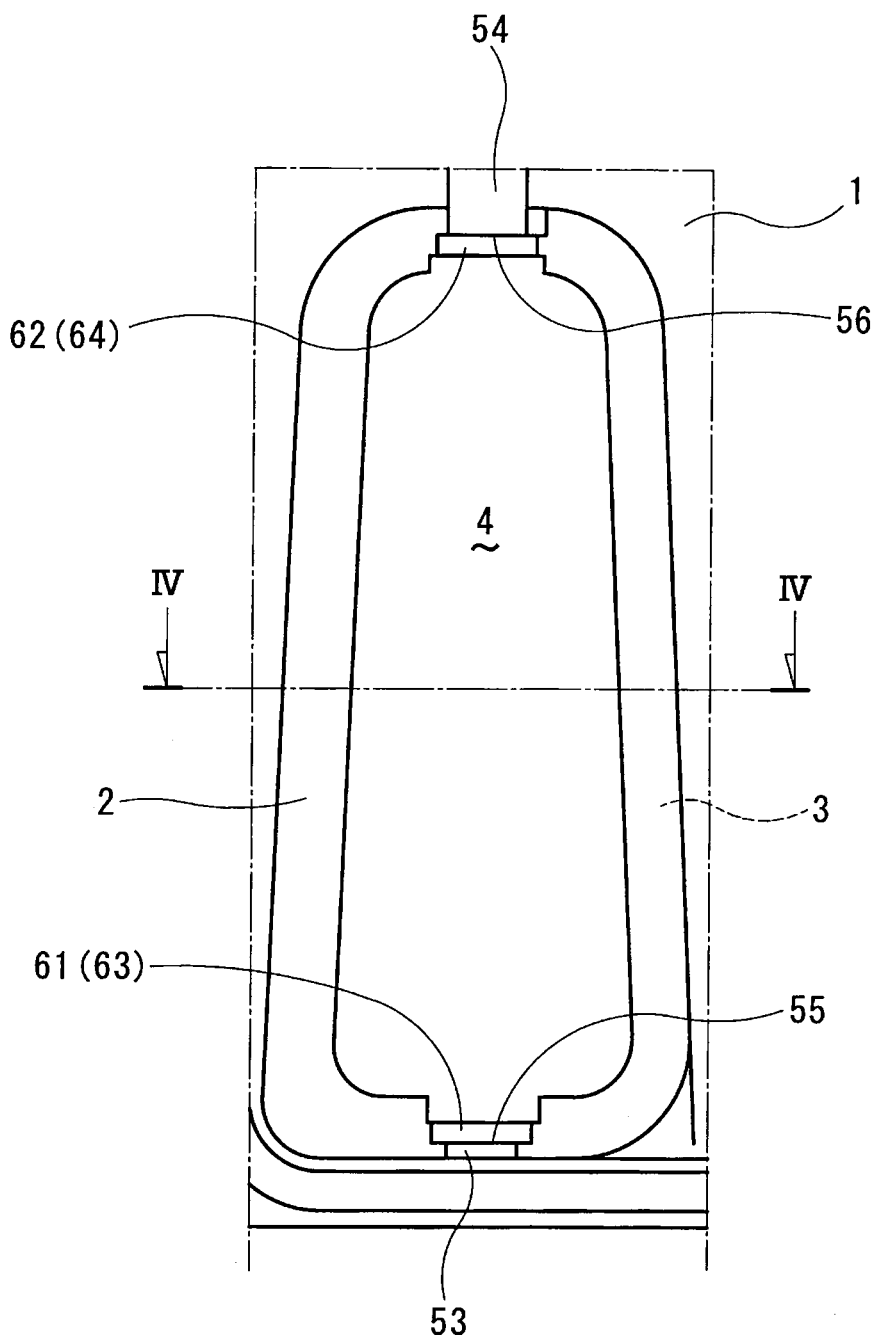
FIG. 3 is a schematic view illustrating the intake control valve.
Figure 4:
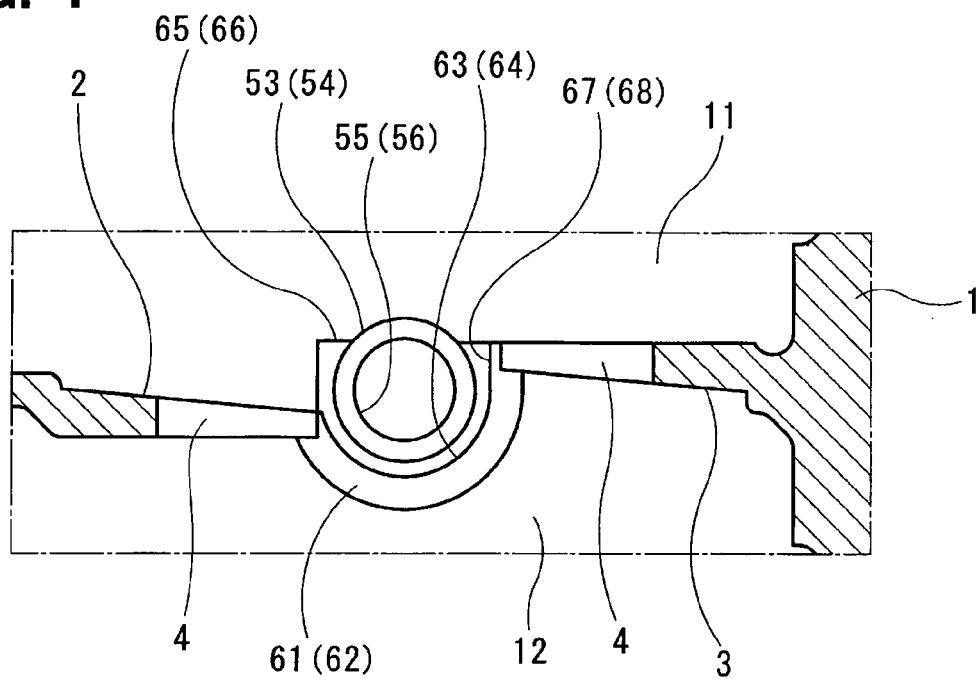
FIG. 4 is a cross-sectional view taken along a line IV-IV shown in FIG. 3.

As shown in FIG. 2, the butterfly valve 5 includes a periphery portion 13 and a periphery portion 14 extending along a peripheral direction of the butterfly valve 5. The periphery portions 13, 14 form an annular band shape, in other words, a rounded generally-rectangular shape. The periphery portions 13, 14 include valve through-holes 15 passing through the periphery portions 13, 14 in a thickness direction of the periphery portions 13, 14 perpendicular to both of a longitudinal direction and a short direction of the butterfly valve 5. The valve through-holes 15 are arranged one after another in the peripheral direction. The periphery portion 13 has an elastic sealing part 16 attached (i.e., fixed) thereto, and the periphery portion 14 has an elastic sealing part 17 attached (i.e., fixed) thereto.

Figure 5:
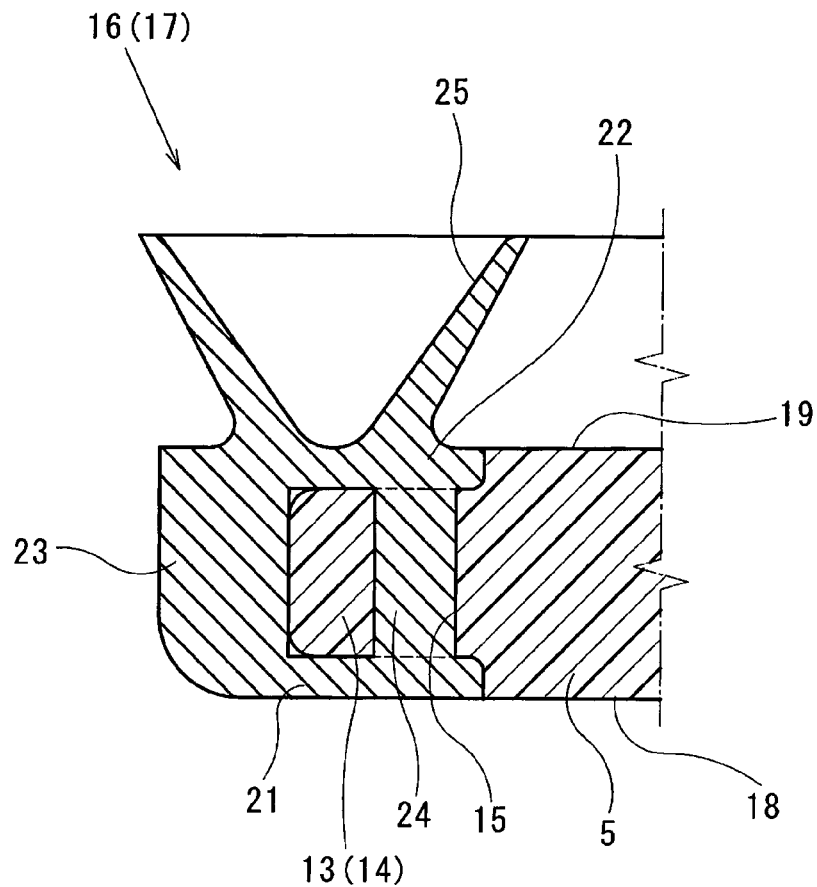
FIG. 5 is a cross-sectional view illustrating a periphery portion of a butterfly valve of the intake control valve according to the first embodiment.

The elastic sealing part 16 and the elastic sealing part 17 are seamlessly formed with each other. As shown in FIG. 5, each of the elastic sealing parts 16, 17 includes elastic covering portions 21, 22, 23 covering an outer periphery portion of the butterfly valve 5. The elastic covering portion 21 is located on a first surface 18, the elastic covering portion 22 is located on a second surface 19, and the elastic covering portion 23 is located on a third surface perpendicular to the first surface 18 and the second surface 19. The first surface 18 is opposite to the second surface 19 with respect to the third surface in the thickness direction.

The elastic sealing part 16 and the elastic sealing part 17, respectively, further includes elastic coupling portions 24 and a seal lip 25.

The elastic coupling portions 24 are filled in the valve through-holes 15, respectively. The elastic covering portion 21 and the elastic covering portion 22 are coupled with each other through the elastic coupling portions 24.

The seal lip 25 has a V-shape in cross-section and extends in the peripheral direction of the butterfly valve 5. When the intake control valve is located at the fully-closing position, the seal lip 25 gas-tightly seals a clearance provided between the valve seats 2, 3 and the periphery portions 13, 14.

The butterfly valve 5 has a connecting portion that is located on a central axis of the butterfly valve 5 extending in the longitudinal direction and that extends in an axial direction of the shaft 6. The connecting portion includes through holes 26, 27, 28 having a rectangular shape in cross-section and fitting grooves 31, 32, 33 having a generally-square U-shape in cross-section. The shaft 6 is inserted into the through holes 26, 27, 28 and the fitting grooves 31, 32, 33 from one side to an other side in the axial direction of the shaft 6.

The fitting grooves 31, 32, 33 extend in the axial direction, and a fitting portion 45 (that will be described after) of the shaft 6 is fitted into the fitting grooves 31, 32, 33. The fitting grooves 31, 32 are open at a center portion of the first surface 18 on a rotation axis of the butterfly valve 5 and recessed toward the second surface 19 that faces the first surface 18 in the thickness direction. The fitting grooves 31, 32 are, in other words, first-side fitting grooves 31, 32. The fitting groove 33 is open at a center portion of the second surface 19 on the rotation axis and recessed toward the first surface 18 that faces the second surface 19 in the thickness direction. The fitting groove 33 is, in other words, a second-side fitting groove 33.

The fitting grooves 31, 32, 33 are partially located in swelling portions 34, 35, 36, for example, as shown in FIG. 2. The swelling portions 34, 35, 35 expand from the first surface 18 or the second surface 19 in the thickness direction, and have an arch shape in cross-section perpendicular to the axial direction.

The through hole 26 passes through the swelling portion 34. The through hole 27 passes through the swelling portion 35 and is open in the axial direction at an end of the swelling portion 35 adjacent to the swelling portion 34. The through hole 28 passes through the swelling portion 36 and is open in the axial direction at an end of the swelling portion 36 adjacent to the swelling portion 34.

The fitting grooves 31, 32, 33 partially include press-fitting grooves 37, 38 at a specified portion in the fitting grooves 31, 32, 33 in the axial direction. The fitting portion 45 of the shaft 6 is press-fitted into the press-fitting grooves 37, 38 to be fastened thereto. The press-fitting grooves 37, 38 include bottom surfaces located below the fitting grooves 31, 32, 33, respectively, and a clearance is defined between the bottom surfaces and the fitting portion 45. When scraps of synthetic resin are provided by press-fitting the shaft 6, the scraps of synthetic resin are held in the clearance.

The connecting portion has a cylindrical boss (i.e., a first boss) 41 and a cylindrical boss (i.e., a second boss) 42 that are formed in a cylindrical shape. The first boss 41 is located at an end of the connecting portion in the axial direction (i.e., a rotation axial direction) integrally with the connecting portion. The second boss 42 is located at an other end of the connecting portion in the axial direction integrally with the connecting portion.

An outer surface of the first boss 41 and an outer surface of the second boss 42 define a cylindrical surface.

The first boss 41 includes a first-boss hole 43 passing through the first boss 41 concentrically in the axial direction (i.e., a central axial direction). The first-boss hole 43 has a rectangular shape in cross-section, and the shaft 6 is inserted in the first-boss hole 43. The second boss 42 includes a second-boss hole 44 passing through the second boss 42 concentrically in the axial direction. The second-boss hole 44 has a rectangular shape in cross-section, and the shaft 6 is inserted in the second-boss hole 44. The first-boss hole 43 and the second-boss hole 44 are concentrically with the through holes 26, 27, 28 in the axial direction.

The shaft 6 extends straight in the axial direction. The shaft 6 is a polygonal cross-section shaft that has a polygonal shape such as a square shape in cross-section perpendicular to the axial direction. The shaft 6 is made of steel according to the present embodiment.

The shaft 6 includes a fitting portion 45 provided integrally with the shaft 6. The fitting portion 45 fits the press-fitting grooves 37, 38 and is coupled with the press-fitting grooves 37, 38. The fitting portion 45 passes through the first-boss hole 43 and the second-boss hole 44. The fitting portion 45 has a first protruding portion 51 and a second protruding portion 52 at both ends of the fitting portion 45 in the axial direction. The first protruding portion 51 protrudes from an end surface of the first boss 41 in the axial direction outwardly from the butterfly valve 5 in the axial direction. The second protruding portion 52 protrudes from an end surface of the second boss 42 in the axial direction outwardly from the butterfly valve 5 in the axial direction.

The shaft 6 includes one end portion (i.e., the first protruding portion 51) and an other end portion (i.e., the second protruding portion 52) in the axial direction. The one end portion of the shaft 6 is housed rotatably in the first bearing hole 55, and the other end portion of the shaft 6 is housed rotatably in the second bearing hole 56.

The first protruding portion 51 has an end that protrudes outward from the partition wall of the surge tank, in other words, from the valve body 1. The end of the first protruding portion 46 is drivingly connected to the actuator 7. The second protruding portion 52 is formed in a circular shape in cross-section and is directly supported by a wall surface of the second bearing hole 56.

The actuator 7 has a motor and a gear reducer. The motor generates power for opening or closing the butterfly valves 5 due to electric power supplied to the motor. The gear reducer reduces a rotation speed of the motor via two stages to be a specified reduction ratio.

The gear reducer has a pinion gear fixed to an output shaft of the motor, a middle gear engaged with the pion gear, and an output gear engaged with the middle gear. The output gear is connected to the shaft 6 to rotate integrally with the shaft 6.

The motor is electrically connected to an exterior power source (e.g., a battery) that is mounted in a vehicle such as a car, through a motor driving circuit that is electrically controlled by the ECU.

The ECU has a microcomputer including at least CPU, ROM, and RAM.

In the ECU, an A/D convertor converts output signals from various sensors such as a crank angle sensor, an accelerator-opening sensor, a throttle opening sensor, a rotation angle detector, a coolant temperature sensor, and an air flow meter, from analog to digital. The converted output signals are input to the microcomputer. The various sensors configure an operation-state detecting device detecting an operation state of the engine.

When an ignition switch is on, in other words, in an IG-ON state, the ECU controls energization of the actuator 7, especially, the motor, based on a control program memorized in a memory such as the ROM.

Specifically, the ECU calculates an engine rotation speed (i.e., an engine speed: NE) based on an NE pulse that is an output signal from the crank angle sensor. Subsequently, the ECU calculates a target opening degree of the butterfly valve 5 corresponding to the engine speed. Then, the ECU feedback-controls a power supply so as to eliminate a deviation between an actual opening degree of the butterfly valve 5 that is output from the valve opening sensor and the target opening degree.

The valve body 1 of the present embodiment will be described hereafter referring to FIGS. 1 to 4.

The valve body 1 is the partition wall in the surge tank. The valve body 1 has the valve seats 2, 3 that are formed integrally with the valve body 1, and the space 4 is defined by the valve seats 2, 3. The valve seat 2 has a periphery portion to which the elastic sealing part 16 attached to the periphery portion 13 of the butterfly valve 5 fits tightly. The valve seat 3 has a periphery portion to which the elastic sealing part 17 attached to the periphery portion 14 of the butterfly valve 5 fits tightly. The valve seats 2, 3 define an opening periphery of the space 4. The space 4 passes through the valve seats 2, 3 in a flow direction of intake air.

The valve body 1 has a first bearing portion 53 supporting the first protruding portion 51 rotatably and a second bearing portion 54 supporting the second protruding portion 52 rotatably. The first bearing portion 53 is a specified distance separated from the second bearing portion 54 in the axial direction such that the first bearing portion 53 and the second bearing portion 54 face to each other. In the present embodiment, the specified distance is equal to a length of the space 4 in a longitudinal direction (i.e., the axial direction).

The first bearing hole 55 of the first bearing portion 53 passes through the first protruding portion 51 in the axial direction. The second bearing hole 56 of the second bearing portion 54 is a bottomed hole.

The valve body 1 has a first projection portion 61 and a second projection portion 62. The first projection portion 61 is formed in a semi-annular shape and projects inward from an inner surface of the first bearing portion 53. The second projection portion 62 is formed in a semi-annular shape and projects inward from an inner surface of the second bearing portion 54. The first projection portion 61 includes a first concave portion 63 that slidably supports the first boss 41. The second projection portion 62 includes a second concave portion 64 that slidably supports the second boss 42. In other words, the first boss 41 and the second boss 42 are placed slidably on the first concave portion 63 and the second concave portion 64, respectively.

The valve body 1 further has a first insertion opening 65 and a second insertion opening 66. The first insertion opening 65 is defined between one circumferential end and an other circumferential end of the first projection portion 61. The second insertion opening 66 is defined between one circumferential end and an other circumferential end of the second projection portion 62. The first insertion opening 65 is open to a radial direction of the first projection portion 61 that is opposite from a midpoint of an arc portion of the first projection portion 61. The second insertion opening 66 is open to a radial direction of the second projection portion 62 that is opposite from a midpoint of an arc portion of the second projection portion 62. The first insertion opening 65 and the second insertion opening 66 have a semi-annular shape and are open to the same direction.

The first projection portion 61 fills and seals a clearance A that is defined between the end surface of the first boss 41 and an end-wall surface defining the space 4 in the axial direction and is formed in a semi-annular shape. The second projection portion 62 fills and seals a clearance B that is defined between the end surface of the second boss 42 and an other end-wall surface defining the space 4 in the axial direction and is formed in a semi-annular shape.

The first concave portion 63 extends from the first insertion opening 65 to an inner center area of the first projection portion 61. The second concave portion 64 extends from the second insertion opening 66 to an inner center area of the second projection portion 62. The first concave portion 63 includes an inner surface defining a first concave surface that has a specified radius of curvature centering a rotation axis (i.e., the central axis) of the butterfly valve 5. The second concave portion 64 includes an inner surface defining a second concave surface that has a specified radius of curvature centering the rotation axis of the butterfly valve 5.

The first projection portion 61 has a first guide portion 67 at a circumferential end of the first projection portion 61. The first guide portion 67 has a flat plate shape extending in a tangential direction of the first concave surface. The second projection portion 62 has a second guide portion 68 at a circumferential end of the second projection portion 62. The second guide portion 68 has a flat plate shape extending in a tangential direction of the second concave surface. The one circumferential end and the other circumferential end of the first projection portion 61 is in a generally 180-degree range in a circumferential direction of the first and second projection portions 61, 62. That is, a virtual line between the one circumferential end and the other circumferential end of the first projection portion 61 is generally a straight line. The one circumferential end and the other circumferential end of the second projection portion 62 is in a generally 180-degree range in the circumferential direction of the first and second projection portions 61, 62. That is, a virtual line between the one circumferential end and the other circumferential end of the second projection portion 62 is generally a straight line.

The first guide portion 67 may be located at the one circumferential end or the other circumferential end of the first projection portion 61, and the second guide portion 68 may be located at the one circumferential end or the other circumferential end of the second projection portion 62. Alternatively, the first guide portion 67 may be located at both of the one circumferential end and the other circumferential end, and the second guide portion 68 may be located at both of the one circumferential end or the other circumferential end of the second projection portion 62. Either way, the first guide portion 67 extends linearly in the tangential direction of the first concave surface, and the second guide portion 68 extends linearly in the tangential direction of the second concave surface.

A method for assembling the intake control valve for the variable intake system, according to the present embodiment, will be described hereafter.

The first boss 41 is placed on the first projection portion 61 through the first insertion opening 65, and the second boss 42 is placed on the second projection portion 62 through the second insertion opening 66. Specifically, the first boss 41 is placed on the inner surface (i.e., the first concave surface) of the first concave portion 63, and the second boss 42 is place on the inner surface (i.e., the second concave surface) of the second concave portion 64.

In a state where the first and second bosses 41, 42 are placed on the first and second projection portions 61, 62, respectively, a central axis of the through-holes 26, 27, 28, a central axis of the fitting grooves 31, 32, 33, a central axis of the first-boss hole 43 and the second-boss hole 44, and a central axis of the first and second bearing holes 55, 56 coincide with each other. That is, the central axis of the butterfly valve 5, a central axis of the first and second bosses 41, 42, and a central axis of the first and second bearing portions 53, 54 coincide with each other.

The shaft 6 is inserted from an outside of the first bearing portion 53 adjacent to the actuator 7 to the first bearing portion 53, the first boss 41, the connecting portion, the second boss 42, and the second bearing portion 54, in this order. For example, the shaft 6 is inserted such that a tip of the second protruding portion 52 is inserted ahead. The shaft 6 is inserted to the connecting portion in the following order of: the first bearing hole 55; the first-boss hole 43: the through hole 27; the fitting groove 31; an opening of the through hole 26; the fitting groove 33; an other opening of the through hole 26; the fitting groove 32; the through hole 28; the second-boss hole 44; and the second bearing hole 56. Then, the fitting portion 45 of the shaft 6 is press-fitted to the press-fitting groove 37 included in the fitting groove 31, the press-fitting groove 38 included in the fitting groove 32, and the press-fitting groove (not shown) included in the fitting groove 33, at a second step.

Thus, since the fitting portion 45 is tightly fixed and supported at a specified position in the axial direction by press-fitting, the butterfly valve 5 is coupled with the shaft 6 to be able to rotate integrally with the shaft 6.

The variable intake system according to the present embodiment operates as follows.

In the variable intake system, the butterfly valve 5 is fully opened when the engine is operated under a high-load-low-speed operation condition, and is fully closed when the engine is operated under a low-load-high-speed operation condition. In the result, a length of a passage through which intake air is supplied to the combustion chamber is changed. Thus, fuel charging efficiency can be secured at any rotation speed within an entire rotation-speed range of the engine by using the inertia supercharging effect.

When intake air leaks in a case where the butterfly valve 5 is fully closed, the inertia supercharging effect is reduced, and the intake control valve cannot improve the fuel charging efficiency.

According to the intake control valve of the present embodiment, sealing effect can be improved in the case where the butterfly valve 5 is fully closed.

As described above, the valve body 1 has the first and second projection portions 61, 62 and the first and second insertion openings 65, 66. The first projection portion 61 having the semi-annular shape is located inside of the first bearing portion 53 so as to cover the first boss 41 partially in the circumferential direction. The second projection portion 62 having the semi-annular shape is located inside of the second bearing portion 54 so as to cover the second boss partially in the circumferential direction. The first insertion opening 65 is defined between the one circumferential end and the other circumferential end of the first projection portion 61 and is open to the radial direction of the first projection portion 61. The second insertion opening 66 is defined between the one circumferential end and the other circumferential end of the second projection portion 62 and is open to the radial direction.

Accordingly, the first boss 41 is placed on the first concave surface of the first projection portion 61 through the first insertion opening 65 from an outside of the valve body 1. The second boss 42 is placed on the second concave surface of the second projection portion 62 through the second insertion opening 66 from an outside of the valve body 1. Thus, the central axis of through-holes 26, 27, 28, the central axis of the fitting grooves 31, 32, 33, the center axis of the first-boss hole 43 and the second-boss hole 44, and the central axis of the first and second bearing holes 55, 56 can easily coincide with each other.

Furthermore, the first and second projection portions 61, 62 can support the butterfly valve 5 in a state where the central axis of the first-boss hole 43 and the second-boss hole 44 and the central axis of the first and second bearing holes 55, 56 coincide with each other. In such a state, the central axis of the first-boss hole 43 and the second-boss hole 44 and the central axis of the first and second bearing holes 55, 56 coincide with the rotation axis of the butterfly valve 5. Accordingly, the shaft 6 can easily be inserted to the connecting portion, the first and second bosses 41, 42, and the first and second bearing portions 53, 54, and the number of components and a number of assembling works can be reduced. Therefore, manufacturing cost can be reduced.

The rotation axis of the butterfly valve 5 is located inside of the through-holes 26, 27, 28 and the fitting grooves 31, 32, 33. Specifically, according to the present embodiment, the through-holes 26, 27, 28 and the fitting grooves 31, 32, 33 are located concentrically with the rotation axis of the butterfly valve 5. The fitting portion 45 is inserted to the through-holes 26, 27, 28 and the fitting grooves 31, 32, 33. The fitting grooves 31, 32, 33 partially includes the press-fitting grooves 37, 38 to which the fitting portion 45 is press-fitted.

The central axis of the first and the second bosses 41, 42 is located inside of the first-boss and second-boss holes 43, 44, respectively. Specifically, according to the present embodiment, the first boss 41 and the first through-hole 43 are located concentrically with each other, and the second boss 42 and the second through-hole 44 are located concentrically with each other.

The central axis of the first and the second bearing portions 53, 54 is located inside of the first and second bearing holes 55, 56, respectively. Specifically, according to the present embodiment, the first bearing portion 53 and the first bearing hole 55 are coaxially with each other, and the second bearing portion 54 and the second bearing hole 56 are coaxially with each other. According to the present embodiment, the first bearing hole 55 of the first bearing portion 53 passes through the first protruding portion 51 in the axial direction. The second bearing hole 56 of the second bearing portion 54 is a bottomed hole. However, the first bearing hole 55 may be a bottomed hole, and the second bearing portion 54 may pass through the second protruding portion 52 in the axial direction.

The first boss 41 and the second boss 42 are located on the inner surfaces of the first and second projection portions 61, 62, respectively. Therefore, the first and second concave surfaces of the first and second projection portions 61, 62 can support the butterfly valve 5 in the case where the central axis of the through-holes 26, 27, 28, the central axis of the fitting grooves 31, 32, 33, the central axis of the first-boss and second-boss holes 43, 44, and the central axis of the first and second bearing holes 55, 56 coincide with each other.

According to the present embodiment, the first and second projection portions 61, 62 include the first and second insertion openings 65, 66, respectively. The first and second insertion openings 65, 66 are opened to the same direction. The valve body 1 includes the first concave portion 63 and the second concave portion 64 having a semi-annular shape. The first concave portion 63 extends from the first insertion opening 65 to an inner center area of the first projection portion 61. The second concave portion 64 extends from the second insertion opening 66 to an inner center area of the second projection portion 62. The first concave portion 63 includes the first concave surface having the specified radius of curvature that centers the rotation axis or the central axis of the butterfly valve 5. The second concave portion 64 includes the second concave surface having the specified radius of curvature that centers the rotation axis or the central axis of the butterfly valve 5.

Accordingly, the first and second bosses 41, 42 are located on the inner surface of the first and second projection portions 61, 62, respectively, through the first and second insertion openings 65, 66, respectively. In other words, the first and second bosses 41, 42 are located on the inner surfaces of the first and second concave surfaces of the first and second concave portions 63, 64, respectively. Therefore, the central axis of the first and second bosses 41, 42 can easily coincide with the central axis of the first and second bearing portions 53, 54.

Furthermore, the inner surfaces of the first and second concave portions 63, 64 are formed in a shape that fits a shape of an outer surface of the shaft 6. Accordingly, the first and second bosses 41, 42 can slidably move on the inner surface of the first and second projection portions 61, 62, respectively, in a rotation direction when the butterfly valve 5 is operated to be open or closed. In other words, the first and second bosses 41, 42 can slidably move on the inner surface of the first and second concave portions 63, 64, respectively, in a rotation direction when the butterfly valve 5 is operated to be open or closed.

According to the present embodiment, the first projection portion 61 has the first guide portion 67 at the circumferential end of the first projection portion 61. The first guide portion 67 has the flat plate shape extending in the tangential direction of the first concave surface. The second projection portion 62 has the second guide portion 68 at the circumferential end of the second projection portion 62. The second guide portion 68 has the flat plate shape extending in the tangential direction of the second concave surface. When the first and second bosses 41, 42 are placed on the inner surfaces of the first and second projection portions 61, 62, respectively, the first and second guide portions 67, 68 guide the first and second bosses 41, 42, respectively. Accordingly, the first and second bosses 41, 42 are promptly placed on a center area of the inner surfaces of the first and second concave surfaces of the first and second projection portions 61, 62, respectively. Therefore, assembling works to attach the first and second bosses 41, 42 to the inner surfaces of the first and second projection portions 61, 62 (i.e., the first and second concave portions 63, 64), respectively, can be expedited. In the result, productivity of the intake control valve can be improved.

The intake control valve of the present embodiment is assembled through the first step and the second step.

Accordingly, the butterfly valve 5 can be supported on the first and second concave surfaces of the first and second projection portions 61, 62 in the state where the central axis of the through-holes 26, 27, 28, the central axis of the fitting grooves 31, 32, 33, the central axis of the first-boss and second-boss holes 43, 44, and the central axis of the first and second bearing holes 55, 56 coincide with each other. Therefore, the shaft 6 can easily be inserted to the connecting portion, the first and second bosses 41, 42, and the first and second bearing portions 53, 54, and the number of components and the assembling works can be reduced. Therefore, manufacturing cost can be reduced.

Conventionally, according to a conventional intake control valve (e.g., an intake control valve described in patent document 1), a clearance having a specified length in the rotation direction is required between a butterfly valve and a wall surface that defines a space of a valve body in the rotation direction. By providing the clearance, a shaft can rotate relative to the valve body. However, the clearance defines a passage through which air leaks when the butterfly valve is fully closed. Accordingly, a leaking amount of the air leaking through the clearance may increase when the butterfly valve 5 is fully closed.

According to the present embodiment, the first and second projection portions 61, 62 are located on the inner surfaces of the first and second bearing portions 53, 54, respectively, such that the first and second projection portions 61, 62 so as to reduce the leaking amount of the air when the butterfly valve 5 is fully closed.

Therefore, the first projection portion 61 can fill and seal the clearance A that is defined between the end surface of the first boss 41 and the end-wall surface defining the space 4 in the axial direction. The second projection portion 62 can fill and seal the clearance B that is defined between the end surface of the second boss 42 and the other end-wall surface defining the space 4 in the axial direction. In the result, the leaking amount of the air when the butterfly valve 5 is fully closed can be reduced.

(Second Embodiment)

Figure 6:
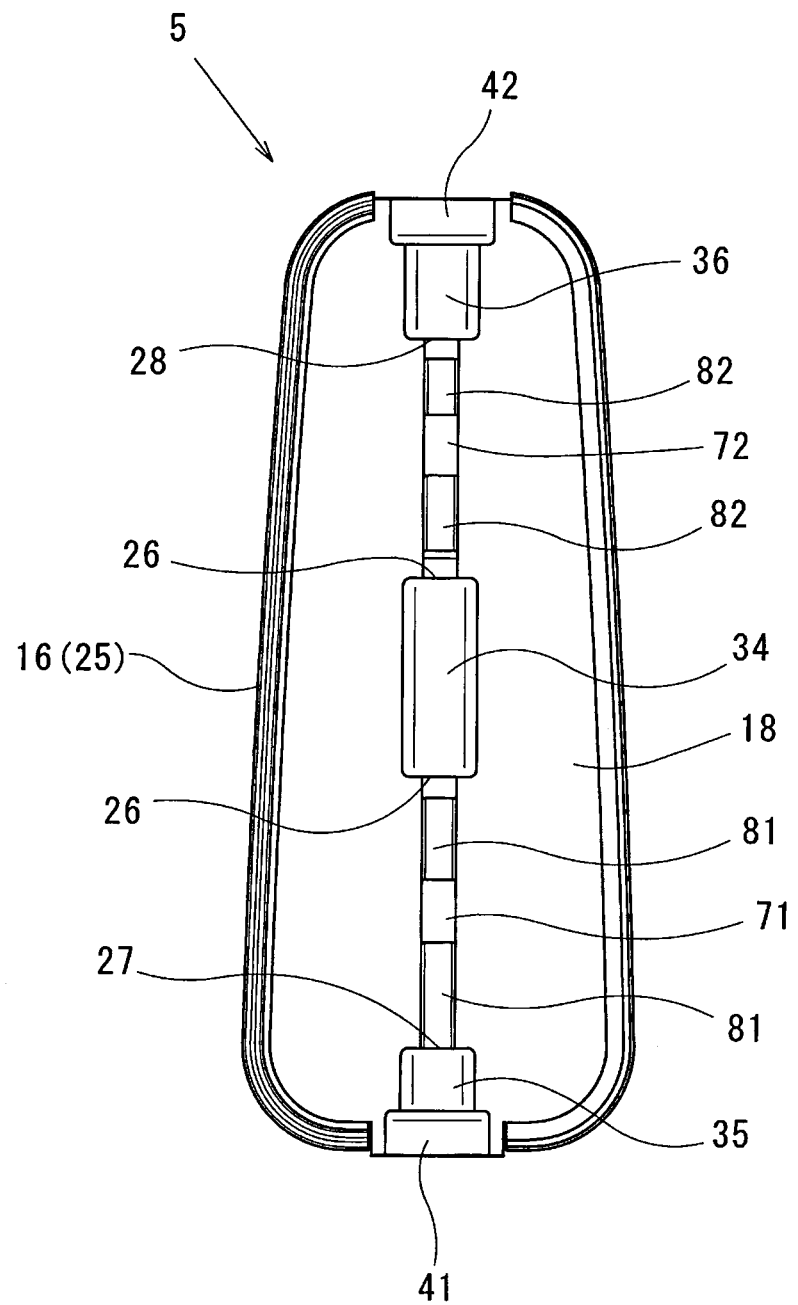
FIG. 6 is a schematic view illustrating a butterfly valve of an intake control valve viewed from one side according to a second embodiment.
Figure 7:
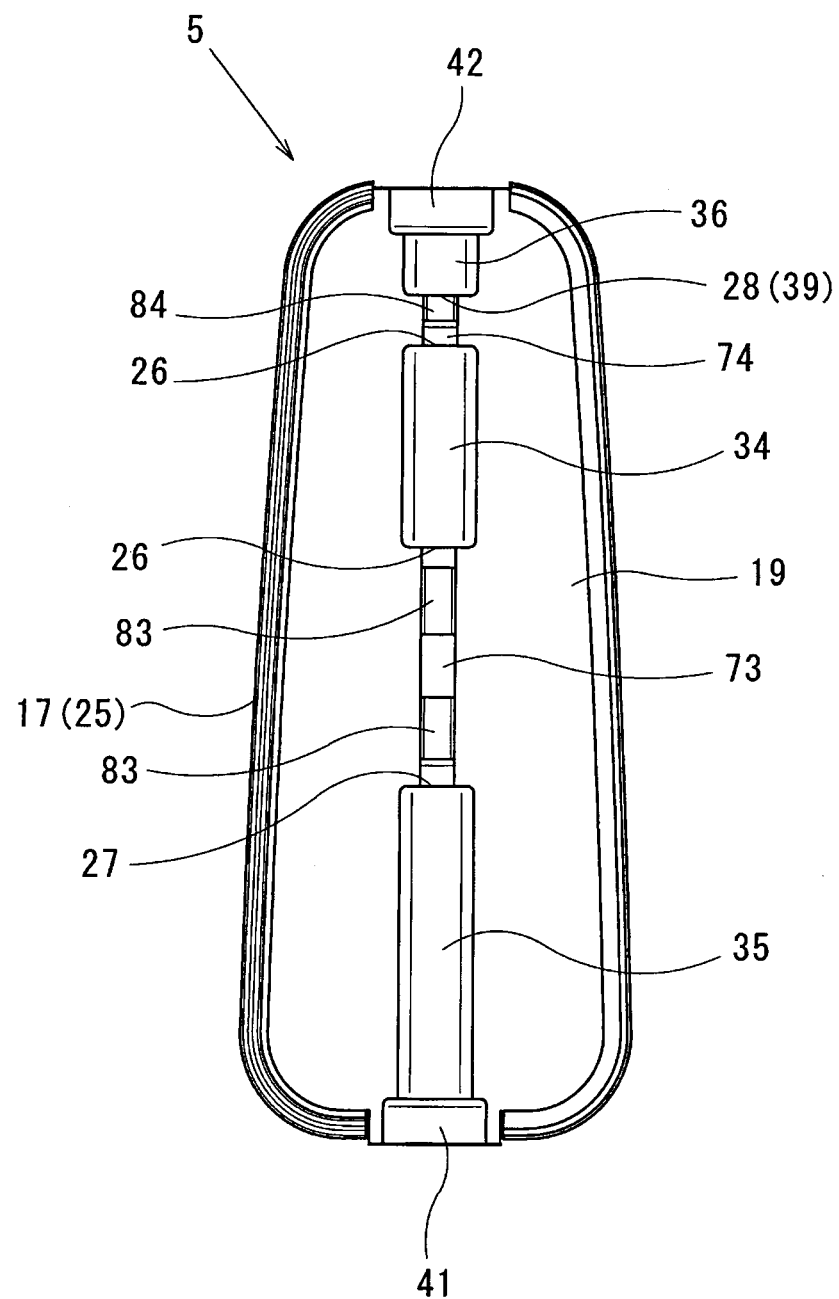
FIG. 7 is a schematic view illustrating the butterfly valve viewed from another side facing the one side according to the second embodiment.

An intake control system having an intake control valve, according to a second embodiment, will be described referring to FIGS. 6 to 8.

The butterfly valve 5 disposed in the intake control valve of the present embodiment has the connecting portion located along the central axis of the butterfly valve 5 that extends in the longitudinal direction of the butterfly valve 5. The connecting portion extends straight in the axial direction of the shaft 6. The connecting portion includes the through holes 26, 27, 28 having the rectangular shape in cross-section and fitting grooves 71, 72, 73, 74 having a generally-square U-shape in cross-section. The shaft 6 is inserted into the through holes 26, 27, 28 and the fitting grooves 71, 72, 73, 74 from one side to an other side in the axial direction of the shaft 6.

The through holes 26, 27, 28 include a press-fitting hole (i.e., a press-fitting portion) 39 to which the fitting portion 45 is press-fitted. Accordingly, the butterfly valve 5 is fixed to the shaft 6, and the shaft 6 can support the butterfly valve 5.

Figure 8:
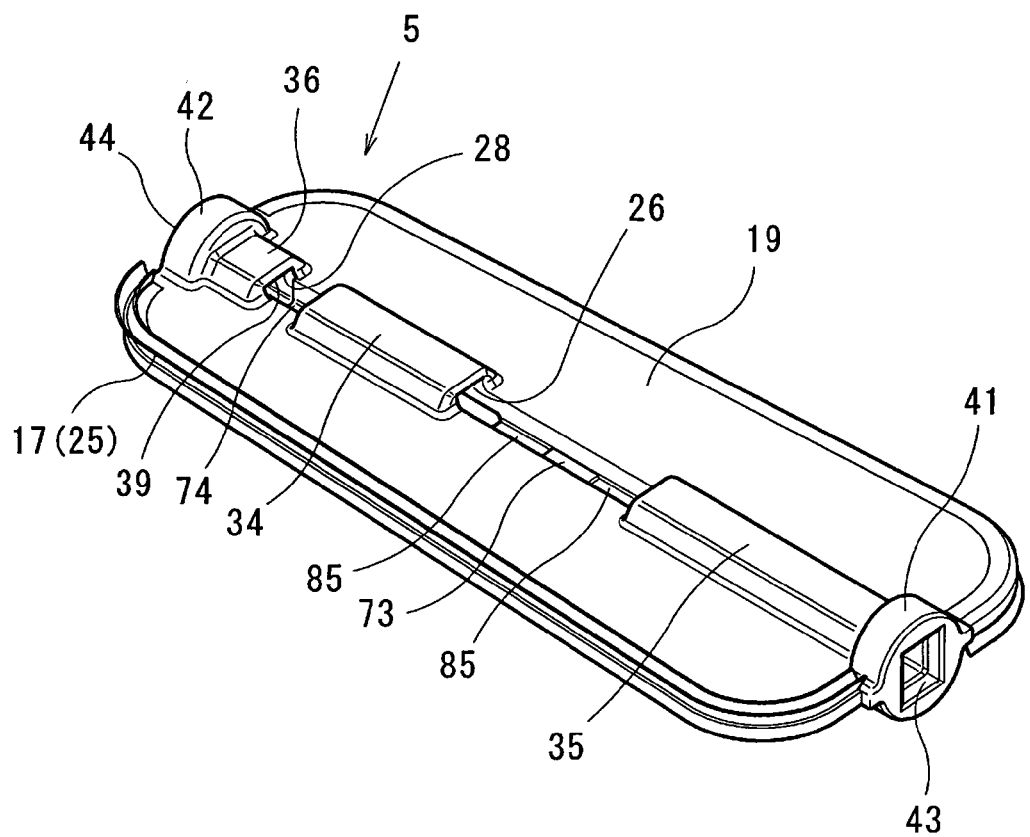
FIG. 8 is a perspective view illustrating the butterfly valve viewed from the another side shown in FIG. 7.

As shown in FIG. 8, the fitting grooves 31, 32, 33 are located inside of the swelling portions 34, 35, 36 that expand to have the arch shape. A first insertion hole is defined between the swelling portion 34 and the swelling portion 35 in the axial direction, and the fitting portion 45 of the shaft 6 is located inside of the first insertion hole. The first insertion hole has a rectangular shape in cross-section perpendicular to the axial direction. A second insertion hole is defined between the swelling portion 34 and the swelling portion 36 in the axial direction, and the fitting portion 45 is located inside of the second insertion hole. The second insertion hole has a rectangular shape in cross-section perpendicular to the axial direction.

The fitting grooves 71, 72, 73, 74 extend in the axial direction, and the fitting portion 45 is press-fitted to the fitting grooves 71, 72, 73, 74. The fitting grooves 71, 72, 73, 74 are partially located inside of the swelling portion 34, 35, 36 that expand from the first surface 18 or the second surface 19 in the thickness direction.

The fitting grooves 71, 72, 73, 74 include press-fitting grooves 81, 82, 83, 84, respectively. The fitting portion 45 is press-fitted to the press-fitting grooves 81, 82, 83, 84. The press-fitting grooves 81, 82, 83, 84 include bottom surfaces located below the fitting grooves 71, 72, 73, 74, respectively, and a clearance is defined between the bottom surfaces and the fitting portion 45. When scraps of synthetic resin are provided by press-fitting the shaft 6, the scraps of synthetic resin are held in the clearance.

The connecting portion has the first boss 41 and the second boss 42 that are formed in the cylindrical shape, similar to the first embodiment. The first boss 41 is located at the end of the connecting portion in the axial direction integrally with the connecting portion. The second boss 42 is located at the other end of the connecting portion in the axial direction integrally with the connecting portion.

The outer surface of the first boss 41 and the outer surface of the second boss 42 define the cylindrical surface. The first boss 41 includes a first-boss hole 43 passing through the first boss 41 concentrically in the axial direction (i.e., a central axial direction). The first-boss hole 43 has a rectangular shape in cross-section, and the shaft 6 is inserted in the first-boss hole 43. The second boss 42 includes a second-boss hole 44 passing through the second boss 42 concentrically in the axial direction. The second-boss hole 44 has a rectangular shape in cross-section, and the shaft 6 is inserted in the second-boss hole 44. The first-boss hole 43 and the second-boss hole 44 are concentrically with the through holes 26, 27, 28 in the axial direction.

Thus, the intake control valve of the present embodiment causes similar effects that are similar to that of the first embodiment.

(Other Modifications)

According to the above embodiments, the actuator 7 operating the butterfly valve 5 that is the valve part of the intake control valve is an electric actuator having the motor and the gear reducer. However, the actuator 7 may be an electromagnetic actuator (i.e., a solenoid actuator) or a negative-pressure type actuator having an electromagnetic negative-pressure control valve or an electric negative-pressure control valve.

According to the above embodiments, the butterfly valve 5 as the valve part is the plate valve. However, the valve part may be a flap valve, a rotary valve, a poppet valve, a spool valve, or the like.

According to the above embodiments, the intake control valve is used in the variable intake system. However, the intake control valve may be used for an electronic throttle in an intake system that has a throttle valve adjusting a flow rate of intake air to be supplied to an internal combustion engine.

Alternatively, the intake control valve of the above embodiments may be used in an intake control system having a tumble control valve. In the intake control system having the tumble control valve, a linear flow (i.e., a drift) of intake air is caused at one side in an intake port in a height direction of the intake port. For example, when a piston moves in a vertical direction, the linear flow is caused at one side in the intake port in the vertical direction. In the result, a vortex (i.e., a tumble flow) of the intake air that swirls around a swirling axis perpendicular to the vertical direction is caused in a combustion chamber of an internal combustion engine, according to the intake control system having the tumble control valve.

Alternatively, the intake control valve of the above embodiments may be used in an intake control system having a swirl control valve. In the intake control system having the swirl control valve, a linear flow (i.e., a drift) of intake air is caused at one side in an intake port in a width direction of the intake port. For example, when a piston moves in the vertical direction, the linear flow is caused at one side in the intake port in the horizontal direction. In the result, a vortex (i.e., a swirl flow) of the intake air that swirls around a swirling axis parallel with the vertical direction is caused in a combustion chamber of an internal combustion engine, according to the intake control system having the swirl control valve.

According to the above embodiments, multiple plate valves are arranged one after another and connected to each other to move integrally. However, a single valve may work as the multiple plate valves as long as the valve is located in a fluid passage such as an intake passage of an internal combustion engine.

Such changes and modifications are to be understood as being within the scope of the present disclosure as defined by the appended claims.

What is claimed is:

1. An intake control valve comprising:
a body having a valve seat that is formed in an annular shape and has a space passing through the valve seat to communicate with a cylinder of an internal combustion engine;
a valve fitting the valve seat to close the space or separating from the valve seat to open the space; and
a shaft connected to the valve to rotate integrally with the valve, the shaft extending in a rotation axial direction of the valve, wherein
the valve has:
   a connecting portion extending in the rotation axial direction;
   a first boss having a cylindrical shape and located at an end of the connecting portion in the rotation axial direction; and
   a second boss having a cylindrical shape and located at an other end of the connecting portion in the rotation axial direction,
the shaft has:
   a fitting portion fitting the connecting portion and coupled with the connecting portion, the fitting portion passing through the first boss and the second boss in the rotation axial direction;
   a first protruding portion protruding from an end surface of the first boss in the rotation axial direction outward from the valve in the rotation axial direction; and
   a second protruding portion protruding from an end surface of the second boss in the rotation axial direction outward from the valve in the rotation axial direction,
the body has:
   a first bearing portion supporting the first protruding portion rotatably;
   a second bearing portion supporting the second protruding portion rotatably;
   a first projection portion formed in a semi-annular shape and projecting inward from an inner surface of the first bearing, the first projection portion supporting the first boss slidably;
   a second projection portion formed in a semi-annular shape and projecting inward from an inner surface of the second bearing, the second projection portion supporting the second boss slidably;
   a first insertion opening defined between one circumferential end and an other circumferential end of the first projection portion and opening to a radial direction of the first projection portion; and
   a second insertion opening defined between one circumferential end and an other circumferential end of the second projection portion and opening to the radial direction to which the first insertion opening is open, and
the first projection portion and the second projection portion partially cover the first boss and the second boss, respectively, in a circumferential direction of the first boss and the second boss.

2. The intake control valve according to claim 1, wherein the first projection portion fills a first clearance defined between the end surface of the first boss and an end-wall surface defining the space in the rotation axial direction, the first clearance having a semi-annular shape, and
the second projection portion fills a second clearance defined between the end surface of the second boss and an other end-wall surface defining the space in the rotation axial direction, the second clearance having a semi-annular shape.

3. The intake control valve according to claim 1, wherein the connecting portion includes a fitting groove to which the shaft is inserted from one end to an other end of the fitting groove in the rotation axial direction.

4. The intake control valve according to claim 3, wherein the fitting groove includes a press-fitting groove to which the shaft is press-fitted.

5. The intake control valve according to claim 1, wherein the connecting portion has a through-hole passing through the connecting portion in the rotation axial direction, and
the shaft is inserted to the through hole from one end to an other end of the connecting portion in the rotation axial direction.

6. The intake control valve according to claim 5, wherein the through-hole includes a press-fitting portion to which the shaft is press-fitted.

7. The intake control valve according to claim 1, wherein the first boss has a first-boss hole passing through the first boss concentrically in the rotation axial direction,
the second boss has a second-boss hole passing through the second boss concentrically in the rotation axial direction, and
the shaft passes through the first hole and the second hole.

8. The intake control valve according to claim 1, wherein the first bearing portion includes a first bearing hole supporting the first protruding portion rotatably, and
the second bearing portion includes a second bearing hole supporting the second protruding portion rotatably.

9. The intake control valve according to claim 1, wherein the first insertion opening and the second insertion opening have a semi-annular shape and are open to the same direction.

10. The intake control valve according to claim 9, wherein the body includes a first concave portion and a second concave portion having a semi-annular shape,
the first concave portion extends from the first insertion opening to an inner center area of the first projection portion, and
the second concave portion extends from the second insertion opening to an inner center area of the second projection portion.

11. The intake control valve according to claim 10, wherein the first concave portion includes a first concave surface having a specified radius of curvature that centers a rotation axis or a central axis of the valve, and
the second concave portion includes a second concave surface having a specified radius of curvature that centers the rotation axis or the central axis of the valve.

12. The intake control valve according to claim 11, wherein the first projection portion has a first guide portion at a circumferential end of the first projection portion, and the first guide portion has a flat plate shape extending in a tangential direction of the first concave surface, and
the second projection portion has a second guide portion at a circumferential end of the second projection portion, and the second guide portion has a flat plate shape extending in a tangential direction of the second concave surface.

13. A method for assembling the intake control valve according to claim 1, the method comprising:
placing the first boss and the second boss on the first projection portion and the second projection portion, respectively, through the first insertion opening and the second insertion opening, respectively;

inserting the shaft to the first bearing portion, the first boss, the connecting portion, the second boss, and the second bearing portion, in this order; and coupling the valve and the shaft to rotate integrally with each other.

* * * * *